March 20, 1928.                    T. DE LA MARE                    1,662,852
REPAIRING PIPE
Filed May 5, 1925
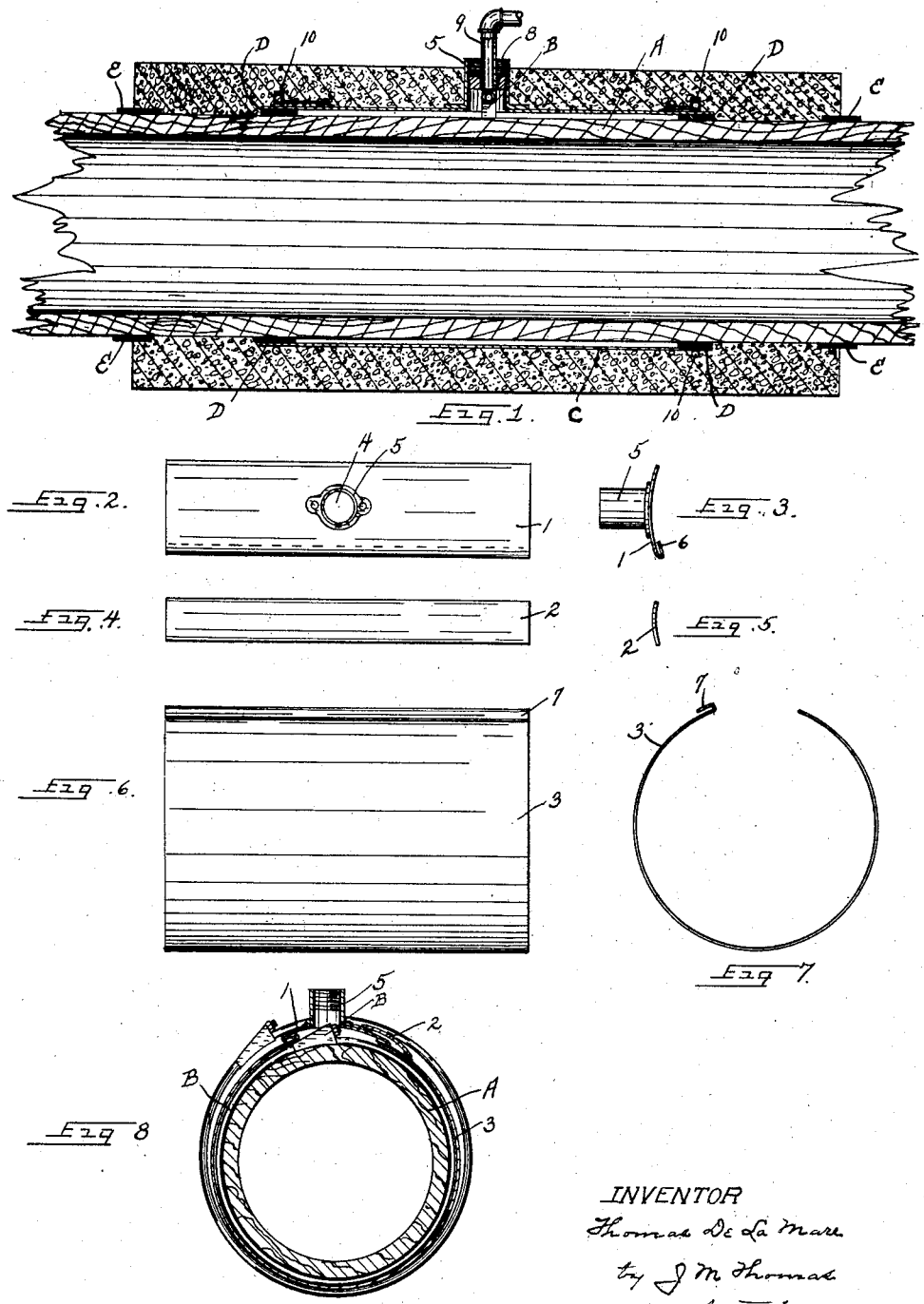

Patented Mar. 20, 1928.

1,662,852

UNITED STATES PATENT OFFICE.

THOMAS DE LA MARE, OF TOOELE, UTAH, ASSIGNOR TO PERCY F. McKENDRICK, OF GARFIELD, UTAH.

REPAIRING PIPE.

Application filed May 5, 1925. Serial No. 28,276.

My invention relates to conduits or pipes and has for its object to provide a device for repairing a leaking wooden stave or iron pipe while in use while carrying liquid under pressure.

A further object is to provide a repair patch which will fit over the metal connections and thus stop leaks around the circular metal bands which are used in wooden stave pipes for holding the pipe together.

These objects I accomplish with the device illustrated in the accompanying drawings in which similar letters and numerals of reference indicate like parts throughout the several views and as described in the specification forming a part of this application and pointed out in the appended claims.

In the drawings of which I have shown the best and most substantial embodiment of my invention, Figure 1 is a longitudinal section of my device in place on a wooden pipe with the concrete around the outside. Figure 2 is a plan view of one of the plates. Figure 3 is an end view of the same plate. Figure 4 is a plan view of the holder strip used in my device. Figure 5 is an end view of the same strip. Figure 6 is an elevation of the large cylindrical sheet which forms the most of the casing used as a part of my invention. Figure 7 is an end view of the sheet shown in Figure 6; and Figure 8 is an end view of the device in place on a wooden pipe without the cement.

It is frequently necessary to repair pipes when the pipe is still in use with liquid flowing through it, and on wooden pipes which are bound together by contraction bands there are often a number of leaks around the bands and it is impossible to stop those leaks effectively with cement or other plastic material, and my device is to stop such leaks and while the pipe is carrying liquid under pressure. By the use of my device the pipe may be exposed and parts which are decayed treated to stop decay and then repaired.

In the drawings I have shown the wooden stave pipe as A, with a metal contraction band as B, only one being shown in the views. Strips of plastic cement D are placed around the exterior of the pipe at spaced apart intervals, and on both sides of the leak, of which there may be several leaks, covered and stopped by one patch. A sheet metal casing C is placed around the pipe, within which is the leak to be stopped, with the end portions of said casing C covering the two strips of cement D nearest the leak. The said sheet metal casing is made up of longitudinally disposed segment strips 1, 2 and 3. The said strip 1 has a central opening 4 therein with a flanged internally threaded sleeve member 5 with its flanged end and flange curved to conform with the outer face of said strip 1, and sealed thereto, to allow leakage liquid to flow through said sleeve member while repairing the pipe A. An internally and externally threaded collar is screwed therein. One of the longitudinal edges of said strip 1 is bent inwardly and back upon itself to form a longitudinal hook 6 thereon. The said strip 2 is laterally curved to give it a segment form, as shown in Figure 5. The said strip 3 is curved to give it a cylindrical form except that its edges do not abut, and one of its longitudinal edges is bent outwardly and back upon itself to form a hook 7 thereon which is engaged with the said hook 6 when the casing is assembled around the pipe A.

The operation and use of my invention is to repair leaks in the pipe A, and the invention may be used where the common tightener band or rod encircles the pipe, as well as where no such band is found. I place a band of plastic cement on each side of the leak around the outer surface of the pipe, and then place the sheet metal strip 3 around the lower side of the pipe with each end resting on the said plastic cement bands. I fill the longitudinal hook 7 with a plastic cement and then place the strip 1 over the top of the pipe with the longitudinal hook 6 engaging with the hook 7, and with the central opening 4 over and above the ends of the band B where the nuts and threaded portion are found on the side of the pipe. I then place another strip of plastic cement along the longitudinal edges of the abutting or lapping edges of the strips 1 and 3; then I place plastic cement along the edges of the strip 2 and place the strip 2 over the lapping edges of the strips 1 and 3 and to form a complete seal I then place contraction bands 10, similar to said band B, around the outside of the completed patch and tighten them until there is no leak at any of the edges and so that all of the liquid is flowing out of the pipe 9, which I screw into the collar 8. Other bands of plastic cement E are placed around the said pipe A and spaced from the said bands D. The cement concrete is then poured and allowed to set, surrounding said pipe from one of said plastic bands E to the other and covering the said strips 1, 2 and 3 and the sleeve member 5 and holding bands 10, as shown in Figure 1. When the concrete is set, the pipe 9 may be withdrawn from said collar 8 and a plug used to close the flow through the said collar, or, if desired, a cap may be screwed on the end of said pipe 9 in place of the elbow shown in Figure 1, and the openings through the said collar and pipe used to tap the pipe for lateral flows. The plastic cement used as the bands E and D may be either liquid asphalt, coal tar, stiff paint, or other suitable material which will form a seal impervious to moisture. Other patches may be placed on said pipe contiguous the one shown by lapping them on either of the bands E.

Having thus described my invention I desire to secure by Letters Patent and claim:—

An apparatus of the class described comprising a sheet metal strip to partially surround a pipe to be repaired having one of its edges bent back upon itself to form a flange; another sheet metal strip having one of its edges bent back upon itself to form a flange thereon and adapted to fit in said flange on said first mentioned metal strip; another metal strip to cover the overlapping edges of said first and second mentioned metal strips forming a cylindrical member; an internally threaded sleeve member secured on the second mentioned strip of metal; an internally and externally threaded collar screwed into said sleeve member; bands of plastic cement placed around the pipe to be repaired and between the ends of said strips and said pipe; means to clamp the ends of said strips and said cement bands tightly against said pipe; and a layer of cement concrete covering said pipe and sheet metal strips.

In testimony whereof I have affixed my signature.

THOMAS DE LA MARE.